United States Patent [19]

Dombro et al.

[11] 3,992,322

[45] *Nov. 16, 1976

[54] PREPARATION OF POLYMERIZATION CATALYST SYSTEMS

[75] Inventors: Robert A. Dombro; George E. Illingworth, both of Arlington Heights; Richard A. Fronczak, Mount Prospect, all of Ill.

[73] Assignee: Universal Oil Products Company, Des Plaines, Ill.

[ * ] Notice: The portion of the term of this patent subsequent to June 10, 1992, has been disclaimed.

[22] Filed: Apr. 11, 1975

[21] Appl. No.: 567,208

[52] U.S. Cl. .............................. 252/429 B; 526/145; 526/348; 526/349; 526/350; 526/351
[51] Int. Cl.² ...................... C08F 4/66; C08F 4/68; C08F 4/62
[58] Field of Search ................................ 252/429 B

[56] References Cited
UNITED STATES PATENTS
3,888,789    6/1975    Dombro et al. ................. 252/429 B

*Primary Examiner*—Patrick P. Garvin
*Attorney, Agent, or Firm*—James R. Hoatson, Jr.; Raymond H. Nelson; William H. Page, II

[57] ABSTRACT

Polymerization catalyst systems which are prepared by admixing an oxide of metal of Group IIA, IIB, IIIA or IVA with a halide of a metal selected from Groups IVB, VB or VIB to chemically fix the metal halide thereon, and thereafter adding an organo Group IA, IIA or IIIA metal alkyl, metal alkyl halide or metal hydride and a Lewis Base modifier to the admixture are improved by prehaliding the oxide with a halogenating agent comprising a halide of aluminum, silicon or phosphorus or post-haliding the mixture of the metal oxide and metal halide with an additional amount of a Group IVB metal halide so that the atomic ratio of halide to Group IVB, VB or VIB metal is greater than 10:1 and preferably greater than 20:1.

11 Claims, No Drawings

3,992,322

PREPARATION OF POLYMERIZATION CATALYST SYSTEMS

BACKGROUND OF THE INVENTION

The prior art is replete with various processes for the polymerization of olefinic hydrocarbons utilizing many varied and substantially different catalyst systems. For example, it is known to prepare and use a catalyst in which a derivative of and especially a hydroxy halide of a bivalent metal of Group IIA of the Periodic Table is reacted with a halide, haloalkoxide or alkoxide of a transition metal of Group IVB, VB or VIB of the Periodic Table by adding a suspension of the bivalent metal derivative to a liquid composed substantially of the transition metal derivative at a temperature in the range of from about 80° to about 180° C. and the reaction product which results is activated with an organometallic compound of a metal of Group IA, IIA, IIIA or IVA of the Periodic Table. However, the use of these catalysts, especially in the homopolymerization of porpylene results in a polypropylene of low crystallinity which is typically 40 to 50 wt. % insoluble in boiling n-heptane. likewise, another particularly well-known prior art polymerization catalyst which is widely used is known commercially as a Ziegler-Natta type catalyst which is usually a titanium trichloride-aluminum chloride complex combined with an aluminum alkyl. When utilizing this catalyst, highly crystalline polymers are obtained in a moderate yield based on titanium. For example, when polymerizing propylene under the conditions cited in the examples of the prior art, there will be obtained yields up to about 1000 grams of polypropylene per gram of titanium on a noncommercial scale. However, substantially less than 50% of the titanium in these catalysts are in usable form. The particular catalyst which is set forth in the prior art will usually determine the form of the resultant polymer and the amount of the finished polymer which is obtained thereby when being utilized in a polymerization process, said resultant polymer usually being in either liquid of solid form. In addition, the various catalysts of the prior art will also determine the physical characteristics of the polymeric product, such characteristics pertaining to elongation, tensile strength, particle size, molecular weight, etc.

As will be hereinafter shown in greater detail, by utilizing a polymerization catalyst system, which is prepared according to the process of this invention, it will be possible to obtain higher yields of crystalline polymers based on the amount of the Group IVB, VB or VIB metal as well as obtaining the polymer in high degree of crystallinity and in a desirable molecular weight range.

This invention relates to a process for the preparation of polymerization catalyst systems. More specifically, the invention is concerned with a process for preparing polymerization catalyst systems which may be used in a polymerization reaction to provide polymers which will possess certain desirable physical characteristics.

The polymers which are obtained by utilizing the polymerization catalyst systems which are prepared according to the process of the present invention may be utilized in many forms and configurations. For example, the polymers prepared when utilizing a catalyst system, the preparation of which is hereinafter set forth in greater detail, will be substantially crystalline in form, the desired product such as polypropylene being generally greater than 80% heptane-insoluble and the molecular weight being in the range of from about 300,000 to about 700,000.

It is therefore an object of this invention to provide a process for the preparation of polymerization catalyst systems.

A further object of this invention is to provide a process for the preparation of polymerization catalyst systems which may be utilized to form polymers possessing certain desirable physical characteristics.

In one aspect an embodiment of this invention resides in the preparation of a polymerization catalyst system wherein a metal alkyl, metal alkyl halide or metal hydride of a Group IA, IIA, or IIIA metal and a Lewis Base modifier selected from the group consisting of hydrocarbyl phosphines, hydrocarbyl phosphine oxides, hydrocarbyl amines, hydrocarbyl amine oxides, hydrocarbyl arsines, hydrocarbyl arsine oxides, hydrocarbyl thioethers, hydrocarbyl oxyethers, hydrocarbyl sulfoxides, are added to a halide of a Group IVB, VB or VIB metal supported on an oxide of a metal of Group IIA, IIB, IIIA or IVA while maintaining the compounds in an inert atmosphere, the improvement which consists in prehaliding said Group IIA, IIB, IIIA or IVA metal oxide before admixture with said Group IVB, VB OR VIB metal halide with a halogenating agent comprising a halide of aluminum, silicon or phosphorus, or phosthaliding said admixture with an additional amount of a halogenating agent comprising a halide of a metal of Group IVB, VB or VIB by contact at a temperature of from about 20° to about 400° C. with said halogenating agent in an amount sufficient to insure that the halide to Group IVB, VB or VIB metal atomic ratio is greater than 10:1.

A specific embodiment of this invention is found in a process for the preparation of a polymerization catalyst system which comprises treating a mixture of magnesium oxide and titanium tetrachloride with an additional amount of titanium tetrachloride so that the ratio of chloride to titanium is greater than 10;1, thereafter adding triisobutylaluminum and diethylphenylphosphine to the product, the additions being carried out while maintaining the compounds in an inert atmosphere suspended in an inert liquid medium, and utilizing the resultant polymerization catalyst system.

Other objects and embodiments will be found in the following further detailed description of the present invention.

As hereinbefore set forth, the present invention is concerned with a process for the preparation of an improved catalyst which is utilized for the homopolymerization or copolymerization of olefins or olefin derivatives whereby the crystallinity and other properties of the resulting polymer or copolymer are substantially improved without a significant and corresponding loss of catalyst activity. As was hereinbefore set forth, catalysts or catalyst systems employing titanium as one of the components thereof which have been utilized in the polymerization of olefinic hydrocarbons as shown in the prior art have had several disadvantages in that the amount of titanium which was usable to polymerize to olefins was relatively low, usually being substantially less than about 50% of the total titanium of the catalyst system and should show only moderate catalytic activity per titanium and the molecular weight of the polymer produced being so high as to require control by the use of hydrogen. In contradistinction to these catalysts, we have now discovered that polymerization catalyst systems which may be prepared according to the process of the present invention will permit the titanium which is present in the system to be more effectively utilized for catalytic activity with a correspondingly greater amount of polymer per gram of titanium being obtained thereby. In addition, by utilizing the supported catalyst system which is prepared according to the process of this invention, it is possible to obtain a polymeric material which possesses a high degree of crystallinity, said polymer, especially in the case of polypropylene, being generally greater than 80% heptane-insoluble. In addition, the polymer produced, especially in the case of polypropylene, falls into the desired molecular weight range without the use of hydrogen. It is to be understood that the term "polymerization" as used in the present specification and appended claims will include homopolymerization of olefinic hydrocarbons such as ethylene, propylene, butene-1, etc., and copolymerization of dissimilar olefinic hydrocarbons such as the copolymerization of ethylene and propylene, ethylene and butylene, propylene and butylene, etc.

Examples of olefinic hydrocarbons which may be polymerized by utilizing a polymerization catalyst system prepared according to the process of this invention will include those olefinic hydrocarbons containing from 2 to about 8 carbon atoms in the molecule such as ethylene, propylene, 1-butene, 1-pentene, 1-hexene, 1-heptene, 1-octene, 3-methylbutene-1, 3-methylbutene-2, etc. In addition, it is also contemplated within the scope of this invention, that isomers of the above olefins such as 2-butene, 2-pentene, 2-hexene, 3-hexene, 2-heptene, 3-heptene, 3-octene, 4-octene, 2-methyl-2-butene, 2-methyl-2-pentene, 2-methyl-2-hexene, or a chlorinated olefin such as vinyl chloride may also be used as a starting material, although the resultant polymers may not be obtained with equivalent results.

The polymerization catalyst systems which are obtained by utilizing the process of the present invention will comprise (1) a halide of a metal selected from Groups IVB, VB or VIB, chemically fixed on a solid support comprising an oxide of a metal selected from Groups IIA, IIB, IIIA and IVA, (2) an organo Group IA, IIA or IIIA metal or derivative thereof and (3) a Lewis Base modifier. It is to be understood that the term "Lewis Base modifier" as used in the present specifications and appended claims may be used interchangeably with the term "Lewis Bases." The Lewis Bases are substances which provide the pairs of electrons for the open sextet of electrons whereby the compounds are able to form addition compounds by sharing electrons provided by the second component.

Examples of halides of metals selected from Groups IVB, VB or VIB of the Periodic Table which may be utilized as one of the components of the catalyst system will include titanium tetrachloride, titanium tetrabromide, titanium tetraiodide, zirconium tetrachloride, zirconium tetrabromide, zirconium tetraiodide, hafnium tetrachloride, hafnium tetrabromide, hafnium tetraiodide, vanadium dichloride, vanadium trichloride, vanadium tetrachloride, vanadium dibromide, vanadium tribromide, vanadium tetrabromide, niobium pentachloride, niobium pentabromide, niobium pentaiodide, tantalum pentachloride, tantalum pentabromide, tantalum pentaiodide chromium trichloride, chromium triiodide, chromiun tribromide, molybdenum dichloride, molybdenum trichloride, molybdenum tetrachloride, molybdenum pentachloride, molybdenum dibromide, molybdenum tribromide, molybdenum tetrabromide molybdenum pentabromide, tungsten dichloride, tungsten tetrachloride, tungsten pentachloride, tungsten hexachloride, tungsten diiodide, tungsten dibromide, tungsten pentabromide, etc.

The solid support on which the halide of a metal selected from Groups IVB, VB or VIB is chemically fixed comprises an oxide of a metal selected from Groups IIA, IIB, IIIA or IVA of the Periodic Table. Some specific examples of these oxides of metals comprise magnesium oxide, beryllium oxide, calcium oxide, strontium oxide, barium oxide, zinc oxide, cadmium oxide, aluminum oxide, boron oxide, silicon oxide, etc. It is also contemplated within the scope of this invention that other oxides such as tin oxide, lead oxide, germanium oxide, gallium oxide, indium oxide and thallium oxide may also be used, although not necessarily with equivalent results. Of the aforementioned metal oxides, the preferred support will comprise a magnesium oxide. These magnesium oxides may have an iodine number ranging from 20 to about 180, a surface area in the range of from about 40 to about 400 square meters per gram, a pore volume ranging from about 0.05 to about 0.5 ml/g., a pore diameter in the range of from about 40 to 200 Angstroms and an average ultimate particle size ranging from about 0.04 to about 50 microns. Of the magnesium oxides which possess the various physical properties within the ranges hereinbefore set forth, the magnesium oxide which is the preferred solid support will have an iodine number of about 135, a surface area of about 270 square meters per gram, a pore volume of about 0.3 ml/g., a pore diameter of about 45 Angstroms, and an average ultimate particle size of about 0.09 microns.

Another component of the catalyst system of the present invention which is used to activate the catalyst component hereinbefore described will comprise an organo Group IA, IIA or IIIA metal or derivative thereof, said organo portion of the compound comprising an alkyl, alkyl halide or it may also comprise a Group IA, IIA or IIIA metal hydride. The alkyl portions of the compound will contain from about 1 to about 4 carbon atoms in each of the alkyl groups. Of the Group IA, IIA or IIIA metals, the preferred metal will comprise aluminum although it is also contemplated within the scope of this invention that lithium, gallium, indium, thallium, beryllium and magnesium may also be used. Some specific examples of these organo metal compounds or derivatives thereof will include trimethylaluminum, triethylaluminum, tripropylaluminum, triisopropylaluminum, tri-n-butylaluminum, tri-t-butylaluminum, dimethylaluminum chloride, diethylaluminum chloride, dipropylaluminum chloride, diisopropylaluminum chloride, di-n-butylaluminum chloride, di-t-butylaluminum chloride, dimethylmagnesium, diethylmagnesium, dipropylmagnesium, diisopropylmagnesium, di-n-butylmagnesium, di-t-butylmagnesium, methylmagnesium chloride, ethylmagnesium chloride, propylmagnesium chloride, isopropylmagnesium chloride, butylmagnesium chloride, dimethylberyllium, diethylberyllium, dipropylberyllium, diisopropylberyllium, di-t-butylberyllium, methylberyllium chloride, ethylberyllium chloride, propylberyllium chloride, isopropylberyllium chloride, the corresponding gallium, indium, and thallium compounds, methyl lithium, etc. In addition, it is also contemplated within the scope of this invention that co-catalysts selected from Group IA, IIA or IIIA metal hydrides may also be employed to activate the catalyst composite. Some specific examples of these co-catalysts will include hydrogen, lithium hydride, sodium hydride, potassium hydride, rubidium hydride, cesium hydride, magnesium hydride, calcium hydride, strontium hydride, barium hydride, aluminum hydride, gallium hydride, indium hydride, thallium hydride, etc., although not necessarily with equivalent results. It is to be understood that the aforementioned co-catalysts are only representative of the class of compounds which may be used, and that the present invention is not necessarily limited thereto.

The Lewis Base modifiers which are utilized to modify the catalyst system will preferably comprise hydrocarbyl phosphines including alkylphosphines in which the alkyl groups contain from 1 to about 4 carbon atoms, such as trimethylphosphine, triethylphosphine, tri-n-propylphosphine, triisopropylphosphine, tri-n-butylphosphine, tri-t-butylphosphine, etc.; triarylphosphines such as triphenylphosphine, tribenzylphosphine, tri-o-toly(phosphine, tri-m-tolyphosphine, tri-p-tolylphosphine, etc.; mixed alkylarylphosphines in which the alkyl groups contain from 1 to about 3 carbon atoms such as dimethylphenylphosphine, diethylphenylphosphine, di-n-propylphenylphosphine diisopropylphenylphosphine, diphenylmethylphosphine, di-phenylethylphosphine, diphenylpropylphosphine, etc., as well as the corresponding hydrocarbyl phosphine oxides. In addition to the preferred Lewis Base modifiers hereinbefore enumerated, it is also contemplated within the scope of this invention that hydrocarbylamines and hydrocarbylarsines such as methylamine, dimethylamine, trimethylamine, ethylamine, diethylamine, triethylamine, propylamine, dipropylamine, tripropylamine, phenylamine, diphenylamine, triphenylamine, etc.; trimethylarsine, triethylarsine, tri-n-propylarsine, triisopropylarsine, triphenylarsine, dimethylphenylarsine, diethylphenylarsine, etc., as well as mixed alkyl or arylamines or arsines and the corresponding hydrocarbyl amine oxides or hydrocarbyl arsine oxides may be used. Other examples of Lewis Base modifiers which may be utilized as the fourth component of the catalyst system will include hydrocarbyl sulfide compounds such as dimethylsulfide, diethylsulfide, dipropylsulfide, diisopropylsulfide, dibutylsulfide, diphenylsulfide, dibenzylsulfide, di-(o-tolyl)-sulfide, di-(m-tolyl)sulfide, di-(p-tolyl)sulfide, etc., dimethylsulfoxide diethylsulfoxide, dipropylsulfoxide, diisopropylsulfoxide, dibutylsulfoxide, diphenylsulfoxide, dibenzylsulfoxide, di-(a-tolyl)sulfoxide, di-(m-tolyl)sulfoxide, di1(p-tolyl)sulfoxide, etc.; ethers such as dimethyl ether, diethyl ether, di-n-propyl ether, diisopropyl ether, tetrahydrofuran, dioxane, methyl phenyl ether (anisole), ethyl phenyl ether (phenetole), propyl phenyl ether, etc.; halophosphines such as chlorodiethylphosphine, etc.

The polymerization catalyst system of the present invention is prepared by calcining the metal oxide support which is selected from the oxides of metals of Groups IIA, IIB, IIIA and IVA of the Periodic Table in either an inert or in an oxygen atmosphere at an elevated temperature. This elevated temperature may be in the range of from about 100° to about 800° C. and the calcination will proceed for a period of time ranging from about 2 to about 20 hours or more in duration. In addition, the oxygen atmosphere may be provided for by the introduction of an oxygen-containing gas such as air or oxygen into the calcination apparatus. In one embodiment of this invention, the calcined support is then subjected to a prehaliding by treatment with a halide of aluminum, silicon or phosphorus. Some specific examples of these halogenating agents will include aluminum chloride, aluminum bromide, aluminum iodide, phosphorus tribromide, phosphorus pentabromide, phosphorus trichloride, phosphorus pentachloride, phosphorus triiodide, phosphorus pentaiodide, disilicon hexabromide, silicon tetrabromide, disilicon hexachloride, silicon tetrachloride, disilicon hexaiodide, silicon tetraiodide, etc. The prehaliding of the metal oxide support may be accomplished over a wide range of temperatures, the operating temperatures ranging from ambient (about 20°–25° C.) up to about 400° C. and at pressures ranging from subatmospheric to 100 atmospheres. The prehaliding is usually accomplished by passing heated vapors of the halogenating agent over the support at an elevated temperature or by contact of the support with the prehaliding agent as a solution in a hydrocarbon medium. It is also contemplated that the prehaliding of the support may be effected by passing the halogenating agent in the form of a gas over the support while the halogenating agent is admixed with a carrier gas consisting of a substantially inert material such as argon or nitrogen.

As an alternate embodiment of the present invention, the prehaliding step may be effected at a period subsequent to the admixture of the halide of a metal selected from Groups IVB, VB or VIB of the Periodic Table with the calcined metal oxide support. When this type of operation is preferred, the metal oxide support which has been calcined in a manner similar to that hereinbefore set forth is placed in an inert atmosphere and, if so desired, may be provided for by an inert gas such as argon, nitrogen, etc. Following this, the halide of the metal of the type hereinbefore set forth in greater detail is charged to the reaction vessel with continuous stirring. After admixture of the material is completed, the resulting slurry is stirred and heated to a temperature in the range of from about 100° to about 150° C. and is maintained thereat for a period of time ranging from about 1 to about 10 hours or more in duration. At the end of this time period, the mixture is allowed to settle and cool to a temperature in the lower end of the range hereinbefore set forth, that is, about 100° to about 120° C. The hot supernatant liquid layer is removed and a fresh metal halide is added to the solid product, the addition accompanied with stirring and followed by reheating for an additional period of time which may range from about 0.25 up to about 0.5 hours. The mixture is again allowed to cool to 100° to 120° C. and the hot clear supernatant liquid is again removed. The addition of fresh metal halide, stirring and heating may be repeated again for an additional 1 to about 10 times. After withdrawal of the unreacted metal halide has been completed, the product may then be contacted with an excess of an inert organic diluent which may comprise a paraffinic hydrocarbon such as n-pentane, n-hexane, n-heptane, etc., again under an inert atmosphere such as argon or nitrogen to remove any unreacted metal halide, following which it is dried in a chamber which is alternately evacuated and filled with an inert gas such as argon. This composite of a metal halide chemically bonded to the metal oxide support may then be posthalided by contact with a halogenating agent comprising a halide of a metal of Group IVB, VB or VIB. It is contemplated within the scope of this invention that the posthaliding step may be accomplished by utilizing the same metal halide which is admixed with the metal oxide support or by utilizing a dissimilar metal halide. For example, the metal oxide support such as magnesium oxide may be admixed with a halide of a metal of Groups IVB, VB or VIB such as titanium tetrachloride in a manner similar to that set forth above and thereafter the posthaliding process may be effected by utilizing a halogenating agent such as chromic chloride, the only criterion being that the halide portion of the halogenating agent be the same as the halide which is used in the admixture step. The contact of the admixture with the halogenating agent is effected under an inert atmosphere such as argon or nitrogen by passing said halogenating agent in a vapor state over the surface of the composite or by contact with the halogenating agent which is in the form of a slurry. The halogenating agent is used in such an amount so that the ratio of the halide to the Group IVB, VB or VIB metal will be at least 10:1 and preferably greater than 20:1, a particular effective catalyst having a halide to Group IVB, VB or VIB metal atomic ratio of between 25:1 and 40:1. As will be hereinafter shown in greater detail by exposing the metal oxide support or the composite of the Group IVB, VB or VIB metal halide chemically bonded to the metal oxide support to the action of a halogenating agent so that the ratio of halide to metal is in a range hereinbefore set forth, it will be possible to obtain a polymer in high yield which possesses a high degree of crystallinity, over 80% heptane-insoluble.

The catalyst component has been subjected to the action of the halogenating agent of the type hereinbefore set forth in greater detail and which will contain the halide to metal ratio within the range hereinbefore set forth is then suspended in a liquid medium following which it is activated and modified by treatment with the remaining co-catalyst element and modifier of the system, the addition of activator comprising an organo metal or derivative thereof in which the metal is selected from Group IA, IIA or IIIA of the Periodic Table, specific examples having been hereinbefore set forth in greater detail, and the Lewis Base modifier, examples also of which have been previously furnished, being effected in an inert atmosphere which is again provided for by the use of a gas such as argon or nitrogen. The addition of the organo metal or derivative thereof and the Lewis Base modifier is usually effected by adding these two components of the finished catalyst system neat or dissolved in an organic diluent of the type hereinbefore set forth, that is, a paraffinic hydrocarbon such as n-hexane, n-heptane, etc., and the resulting mixture is stirred. The finished polymerization catalyst system which is prepared in the above manner will usually contain the component in a weight % range of from about 85 to about 92 weight % of the metal oxide having the metal halide chemically fixed thereon, from about 3 to about 4 weight % of the organo metal or organo metal derivative and from about 12 to about 4 weight % of the Lewis Base modifier. In addition, the components will usually be present in a mole ratio of organo Group IA, IIA or IIIA metals or derivatives thereof per mole of the Group IVB, VB or VIB metal of from about 0.01:1 to about 10:1, the mole ratio of the Lewis Base modifier per mole of Group IVB, VB or VIB metals of from about 0.01:1 to about 10:1. It is desirable but not essential that the mole ratio of organo Group IA, IIA or IIIA metal or derivative thereof to Lewis Base modifier be 1:1.

The polymerization catalyst system which has been prepared according to the method hereinbefore set forth may be utilized in the polymerization of olefinic hydrocarbons, especially those containing 2 to about 8 carbon atoms. The process by which said olefinic hydrocarbons are polymerized may be effected in either a batch, continuous, semi-continuous, gas phase or bulk manner of operation. For example, when a batch type operation is used, a quantity of the polymerization catalyst system which has been prepared according to the process of the present invention is placed in an appropriate apparatus, usually under an inert atmosphere which is provided for by the introduction of an inert gas such as argon or nitrogen into the system. If so desired, the catalyst system may be composited prior to its use in the polymerization apparatus, alternatively, a component of the system comprising the metal halide chemically fixed on the metal oxide support which has been subjected to a prehalogenation or posthalogenation step whereby the halide to Group IVB, VB or VIB metal atomic ratio is at least 10:1 and preferably greater than 20:1 is placed in the polymerization apparatus. Following this, the remaining components of the system comprising the co-catalyst such as an organo Group IA, IIA or IIIA metal or derivative thereof and the Lewis Base modifier may be thereafter added to the apparatus thereby preparing the polymerization catalyst system in situ. If so desired, the polymerization of the olefinic hydrocarbon may be effected in a liquid medium, said medium which may be utilized as the vehicle in which the polymerization reaction is effected comprising inert hydrocarbon compounds such as linear or branched chained paraffins including n-pentane, n-hexane, n-heptane, isopentane, isohexane, or mixtures thereof, etc.; aromatic hydrocarbons such as benzene, toluene, o-xylene, m-xylene, p-xylene, ethylbenzene, etc.; or other monomer or mixture of monomers which are to undergo polymerization, the monomer serving both as the medium and the polymerization component or components. Thus, for example, propylene may be polymerized under a relatively high pressure so that the propylene is in liquid form, thereby acting as both the medium and the polymerization charge stock. After all of the polymerization catalyst system has been added or formed, the apparatus, which may comprise an autoclave of the rotating or mixing type, is heated to the desired polymerization temperature which may be in a range of from about 25° to about 200° C. or more and preferably in a range of from about 50° to about 80° C., and the olefinic hydrocarbon which is to undergo polymerization is charged thereto. The pressure at which the polymerization is effected may range from atmospheric up to about 2,000 pounds per square inch, the superatmospheric pressure being provided for by the autogenous pressure of the olefin if in gaseous form, by the introduction of an inert gas such as nitrogen or argon if the olefin is in liquid form or a combined pressure resulting from the partial pressure afforded by the gaseous olefin and the remainder being provided for by the inert gas. The reactor is maintained at the predetermined conditions of temperature and pressure for a reaction period which is in a range of from about 0.5 up to about 10 hours or more in duration. At the end of the reaction period, the apparatus and contents thereof are allowed to return to room temperature, the excess pressure, if any, is discharged, the catalyst is quenched by the addition of an alcohol such as methyl alcohol, ethyl alcohol, n-propyl alcohol, isopropyl alcohol, n-butyl alcohol, etc., and the reactor is opened. The desired polymeric product is recovered and, if so desired, purified by any conventional means known in the art to remove a substantial portion of the catalyst before passage to storage.

It is also contemplated within the scope of this invention that the polymerization process for the production of predominantly crystalline polymers may be effected in a continuous manner of operation when using a polymerization catalyst system which has been prepared according to the process of the present invention. When such a type of operation is utilized, the monomer comprising the olefinic hydrocarbon is continuously charged to a reaction vessel which is maintained at the proper operating conditions of temperature and pressure, said vessel containing the polymerization catalyst system prepared according to the process of the present invention. Alternatively speaking, the reactor may be provided with one component of the catalyst system while the remaining components of the system comprising the co-catalyst and the modifier are charged to the reactor through separate lines, thus forming the polymerization catalyst system in situ. Upon completion of the desired residence time in the reaction vessel, the reactor effluent is continuously discharged and the polymer is recovered by any conventional means of which are well known in the art, any unreacted olefinic monomer being recycled to form a portion of the feed stock.

The following examples are given to illustrate the preparation of the polymerization catalyst system and the polymerization process in which olefinic hydrocarbons are converted in high yield to predominantly crystalline polymers, said examples are given merely as illustrations and are not intended to limit the generally broad scope of the present invention in strict accordance therewith.

EXAMPLE I

To illustrate the necessity for preparing a catalyst polymerization system according to the process of the present invention, a conventional catalyst was first prepared by calcining magnesium oxide at a temperature of about 140° C. in air at atmospheric pressure for a period of about 18 hours. At the end of this time, the heating was discontinued and after returning to room temperature the magnesium oxide was placed under an atmosphere of dry nitrogen. Following this, 19.8 grams of the calcined magnesium oxide was treated with 190 grams (1 mole) of titanium tetrachloride. The treatment was effected by adding the titanium tetrachloride to the powdered magnesium at ambient temperature while maintaining vigorous stirring of the mixture. The resultant slurry was then heated to a temperature of 110° C. and maintained at a temperature in the range of from about 110° to about 128° C. for a period of 1 hour. At the end of this time, an excess of about 150 cc of n-heptane was added to the slurry. The resultant mixture was then stirred for an additional period of 0.5 hours followed by separation of the solid from the liquid by filtration while maintaining the mixture under a nitrogen blanket. The product was then washed free of unreacted titanium tetrachloride with additional n-heptane. Analysis of the product by atomic absorption disclosed that the chlorine:titanium atomic ratio was 7:1.

The catalyst prepared according to the above paragraph was then modified with the addition of 0.23 grams (1.38 mmole) of diethylphenylphosphine and utilized to polymerize propylene, said polymerization of the propylene being effected at a temperature of about 60° C. and at a pressure of 35 psig. At the end of a period of 5 hours, the reaction mixture which contained the polymer was cooled to room temperature, the excess pressure was discharged and the catalyst was quenched by the addition of n-butyl alcohol. The solid polymer was collected, washed with an alcohol-water solution and dried. It was found that the activity of the catalyst was low, there being only 540 grams of polymer per gram of titanium.

EXAMPLE II

To illustrate the unexpected activity of a catalyst which was prepared according to the process hereinbefore set forth, 20.1 grams of magnesium oxide which had been calcined at a temperature of about 140° C. in air at atmospheric pressure for about 18 hours was placed under an atmosphere of dry nitrogen and treated with 190 grams (1 mole) of titanium tetrachloride by adding the titanium tetrachloride to the powdered magnesium oxide at a temperature of 0° C. while maintaining a vigorous stirring of the mixture. The resultant slurry was then heated to a temperature of from 110° to 134° C. during a period of 1 hour. At the end of this time, stirring and heating were discontinued and the mixture was allowed to settle. When the temperature of the mixture had reached 105° C. the hot supernatant clear liquid layer was removed and an additional portion of 30 cc of titanium tetrachloride was added to the solid product. The resulting mixture was stirred and reheated back to a temperature of 135° C. and maintained thereat for a period of 10 minutes, following which the mixture was again allowed to settle and cool to a temperature of 105° C. before removing the hot clear supernatant liquid. The posthalogenation step using additional titanium tetrachloride was repeated for 3 more times utilizing a 30 cc portion of titanium tetrachloride for each addition. At the end of the addition of the final portion of the titanium tetrachloride and after decantation of the hot clear supernatant liquid, the product was allowed to cool to room temperature and diluted with an excess amount of n-heptane in order to remove any unreacted titanium tetrachloride which was still present. The catalyst component was dried in a chamber which was alternately filled and evacuated with nitrogen. Analysis of this catalyst component by atomic absorption disclosed a chloride:titanium atomic ratio of 34:1.

The catalyst component which was prepared according to the above paragraph, 6.6 grams (0.51 moles of titanium metal), was placed in a polymerization bottle under a blanket of argon followed by sealing with a crown cap and a neoprene septum. Following this, about 400 cc of n-heptane was added as the liquid medium and a co-catalyst comprising 1.51 mmoles of triisobutylaluminum was added to the catalyst component suspension, the addition being accomplished while stirring at room temperature. A modifier comprising 1.68 mmoles of diethylphenylphosphine was added to the activated catalyst component. The mixture was then heated to a temperature of about 60° C. and propylene was introduced at a pressure of 34 psig. The reaction was allowed to proceed for a period of 3.5 hours, at the end of which time the reaction mixture which contained the polymer was cooled to room temperature, the excess pressure was discharged and the catalyst was quenched by the addition of n-butyl alcohol. The solid polymer was collected, washed with an alcohol-water solution and dried. It was found that the activity of the catalyst was 3544 grams of polypropylene per gram of titanium and, in addition, the granular polypropylene which was prepared was 81 weight % insoluble in boiling n-heptane.

EXAMPLE III

To illustrate the use of a prehaliding step, magnesium oxide which is calcined at a temperature of about 300° C. in a stream of nitrogen is prehalided by passing aluminum chloride which is previously sublined at a temperature of from 175° to 200° C. through the dried magnesium oxide while maintaining the temperature at 300° C. using nitrogen as a carrier gas. When the desired amount of chloride is deposited on the magnesium oxide, the halided magnesium oxide is treated with titanium tetrachloride in a manner similar to that set forth in the above examples. The catalyst component which will possess a chloride:titanium atomic ratio of greater than 10:1 is then treated in a manner similar to that set forth in Example II above, that is, by being activated by the addition of triisobutylaluminum and modified by the addition of diethylphenylphosphine. After activation and modification the catalyst is utilized to polymerize propylene, the polypropylene which is recovered from the polymerization step showing a high crystallinity as evidenced by the high weight % which is insoluble in boiling n-heptane and which will also be obtained in a greater amount of polypropylene per amount of titanium.

EXAMPLE IV

In a manner similar to that set forth in Example III above, magnesium oxide is dried at a temperature of 150° C. in a stream of nitrogen for a period of 18 hours. Thereafter silicon tetrachloride is vaporized in a stream of nitrogen at a temperature of 150° C. and passed over the dried magnesium oxide at a temperature of about 150° C. Upon completion of the addition of the silicon tetrachloride, the prehalided magensium oxide is then contacted with titanium tetrachloride at a temperature of 110° C. for a period of 1 hour. At the end of the 1-hour period, an excess of n-heptane is added and the mixture is stirred for a period of 0.5 hours. The product is then washed, activated by the addition of triisobutylaluminum and modified by the addition of ethyldiphenylphosphine.

Utilization of this catalyst in the polymerization of propylene will result in the obtention of a solid polymer which will be over 80 weight % insoluble in boiling n-heptane and will be present in such an amount that the activity of the catalyst will be over 3000 grams of polymer per gram of titanium which is present in said catalyst.

EXAMPLE V

In this example magnesium oxide is calcined at a temperature of about 150° C. for a period of about 6 hours in air. At the end of this time, magnesium oxide is placed under a nitrogen blanket and prehalided by being subjected to a stream of phosphorus trichloride in a vapor state utilizing nitrogen as the carrier gas.

The prephalided support which is prepared according to the above paragraph is then utilized as one portion of the catalyst polymerization system by placing the magnesium oxide under an atmosphere of dry argon and adding 190 grams of titanium tetrachloride to the powdered prehalided magnesium oxide at a temperature of 25° C. while subjecting the mixture to vigorous stirring. The resulting slurry is then continuously stirred while being heated to a temperature of 135° C. and maintained thereat for a period of 1 hour. At the end of the 1-hour period, heating is discontinued, the mixture is allowed to settle and cooled to room temperature. The mixture is then filtered under a nitrogen blanket, analysis of the product showing that there is a chloride:titanium atomic ratio of greater than 20:1. Following this, the catalyst component is placed in a polymerization bottle under a blanket of nitrogen and a liquid medium comprising n-heptane is added thereto. Following this, a solution of triisobutylaluminum in n-heptane is added to activate the catalyst which is thereafter modified by the addition of diethylphenylphosphine to the catalyst system. This catalyst system is again used to polymerize propylene in a manner similar to that set forth in the above examples, the solid polymer which results from this polymerization reaction being over 80 weight % insoluble in boiling n-heptane and being present in an amount which indicates that the activity of the catalyst will be over 3000 grams of polymer per gram of titanium which is present in the polymerization catalyst system.

We claim as our invention: sulfoxides

1. In the preparation of a polymerization catalyst system wherein a metal alkyl, metal alkyl halide or metal hydride of a Group IA, IIA or IIIA metal and a Lewis Base modifier selected from the group consisting of hydrocarbyl phosphines, hydrocarbyl phosphine oxides, hydrocarbyl amines, hydrocarbyl amine oxides, hydrocarbyl arsines, hydrocarbyl arsine oxides, hydrocarbyl thioethers, hydrocarbyl oxyethers, and hydrocarbyl sufoxides are added to a halide of a Group IVB, VB or VIB metal supported on an oxide of a metal of Group IIA, IIB, IIIA or IVA while maintaining the compounds in an inert atmosphere, the improvement which consists in prehaliding said Group IIA, IIB, IIIA or IVA metal oxide before admixture with said Group IVB, VB or VIB metal halide with a halogenating agent comprising a halide of aluminum, silicon or phosphorus, or posthaliding said admixture with an additional amount of a halogenating agent comprising a halide of a metal of Group IVB, VB or VIB, said halogenating agent and metal halide possessing the same halide moiety, by contact at a temperature of from about 20° to about 400° C. with said halogenating agent in an amount sufficient to insure that the halide to Group IVB, VB or VIB metal atomic ratio is greater than 10:1.

2. The improvement as set forth in claim 1 in which said halogenating agent is titanium tetrachloride.

3. The improvement as set forth in claim 1 in which said halogenating agent is aluminum chloride.

4. The improvement as set forth in claim 1 in which said halogenating agent is phosphorus trichloride.

5. The improvement as set forth in claim 1 in which said halogenating agent is chromium chloride.

6. The improvement as set forth in claim 1 in which said halogenating agent is silicon trichloride.

7. The improvement as set forth in claim 1 in which said metal oxide is magnesium oxide.

8. The improvement as set forth in claim 1 in which said metal alkyl is a metal trialkyl containing from 1 to about 4 carbon atoms in each of the alkyl groups.

9. The improvement as set forth in claim 1 in which said metal alkyl halide is a dialkyl metal chloride containing from 1 to about 4 carbon atoms in each of the alkyl groups.

10. The improvement as set forth in claim 1 in which said Lewis Base modifier is selected from the group consisting of trialkyl phosphines having from 1 to about 4 carbon atoms in each of the alkyl groups, triphenylphosphines, tribenzylphosphines, tritolylphosphines, dialkylphenylphosphines having from 1 to about 3 carbon atoms in each of the alkyl groups and diphenylalkylphosphines having from 1 to about 3 carbon atoms in the alkyl groups.

11. The improvement as set forth in claim 1 in which said metal alkyl is triisobutylaluminum, said Group IVB metal halide is titanium tetrachloride and said Lewis Base modifier is diethylphenylphosphine.

* * * * *